United States Patent
Liao et al.

(10) Patent No.: US 7,581,084 B2
(45) Date of Patent: Aug. 25, 2009

(54) METHOD AND APPARATUS FOR EFFICIENT LOADING AND STORING OF VECTORS

(75) Inventors: Yu-Chung C. Liao, Austin, TX (US);
Peter A. Sandon, Essex Junction, VT (US); Howard Cheng, Redmond, WA (US)

(73) Assignee: Nintendo Co., Ltd., Kyoto (JP)

( * ) Notice: Subject to any disclaimer, the term of this patent is extended or adjusted under 35 U.S.C. 154(b) by 388 days.

(21) Appl. No.: 10/849,804

(22) Filed: May 21, 2004

(65) Prior Publication Data

US 2005/0021926 A1    Jan. 27, 2005

Related U.S. Application Data

(63) Continuation of application No. 09/918,524, filed on Aug. 1, 2001, now abandoned, which is a continuation of application No. 09/545,183, filed on Apr. 7, 2000, now Pat. No. 6,701,424.

(51) Int. Cl.
*G06F 9/30* (2006.01)
(52) U.S. Cl. .......................... 712/210; 712/2
(58) Field of Classification Search ............. 712/2, 712/3, 22, 210
See application file for complete search history.

(56) References Cited

U.S. PATENT DOCUMENTS

| | | | | |
|---|---|---|---|---|
| 4,128,880 A | * | 12/1978 | Cray, Jr. ..................... 712/4 |
| 4,454,578 A | * | 6/1984 | Matsumoto et al. ......... 712/204 |
| 4,541,046 A | | 9/1985 | Nagashima et al. |
| 4,644,471 A | * | 2/1987 | Kojima et al. ................ 707/3 |
| 4,677,573 A | * | 6/1987 | Brown et al. ................ 345/443 |
| RE32,493 E | * | 9/1987 | Matsumoto et al. ......... 712/210 |
| 4,785,400 A | * | 11/1988 | Kojima et al. ............... 707/100 |
| 4,841,438 A | * | 6/1989 | Yoshida et al. ................ 712/5 |
| 4,881,168 A | | 11/1989 | Inagami et al. |
| 4,994,962 A | | 2/1991 | Mageau et al. |
| 5,073,970 A | | 12/1991 | Aoyama et al. |
| 5,155,820 A | * | 10/1992 | Gibson ....................... 712/210 |
| 5,201,058 A | | 4/1993 | Kinoshita et al. |
| 5,226,171 A | | 7/1993 | Hall et al. |
| 5,241,633 A | * | 8/1993 | Nishi ........................ 712/216 |
| 5,261,113 A | | 11/1993 | Jouppi |

(Continued)

FOREIGN PATENT DOCUMENTS

EP         489552 A2      6/1992

OTHER PUBLICATIONS

Motorola Inc., "PowerPC Microprocessor Family: The Programming Environments", 1994.

(Continued)

*Primary Examiner*—Aimee J Li
(74) *Attorney, Agent, or Firm*—Nixon & Vanderhye P.C.

(57) ABSTRACT

A method and apparatus for loading and storing vectors from and to memory, including embedding a location identifier in bits comprising a vector load and store instruction, wherein the location identifier indicates a location in the vector where useful data ends. The vector load instruction further includes a value field that indicates a particular constant for use by the load/store unit to set locations in the vector register beyond the useful data with the constant. By embedding the ending location of the useful date in the instruction, bandwidth and memory are saved by only requiring that the useful data in the vector be loaded and stored.

25 Claims, 4 Drawing Sheets

U.S. PATENT DOCUMENTS

| | | | |
|---|---|---|---|
| 5,299,320 A | | 3/1994 | Aono et al. |
| 5,349,692 A | * | 9/1994 | Nishi .......................... 712/9 |
| 5,418,973 A | | 5/1995 | Ellis et al. |
| 5,423,051 A | | 6/1995 | Fuller et al. |
| 5,481,746 A | * | 1/1996 | Schiffleger et al. ............. 712/7 |
| 5,510,934 A | | 4/1996 | Brennan et al. |
| 5,513,366 A | | 4/1996 | Agarwal et al. |
| 5,526,504 A | | 6/1996 | Hsu et al. |
| 5,535,347 A | * | 7/1996 | Grochowski et al. ........ 712/204 |
| 5,537,538 A | | 7/1996 | Bratt et al. |
| 5,537,606 A | | 7/1996 | Byrne |
| 5,544,337 A | * | 8/1996 | Beard et al. .................... 712/4 |
| 5,561,808 A | | 10/1996 | Kuma et al. |
| 5,572,704 A | | 11/1996 | Bratt et al. |
| 5,574,924 A | | 11/1996 | Yoshinaga et al. |
| 5,586,276 A | * | 12/1996 | Grochowski et al. ........ 712/204 |
| 5,604,909 A | | 2/1997 | Joshi et al. |
| 5,632,025 A | | 5/1997 | Bratt et al. |
| 5,638,500 A | | 6/1997 | Donovan et al. |
| 5,669,013 A | | 9/1997 | Watanabe et al. |
| 5,673,407 A | | 9/1997 | Poland et al. |
| 5,689,653 A | | 11/1997 | Karp et al. |
| 5,734,874 A | | 3/1998 | Van Hook et al. |
| 5,740,402 A | | 4/1998 | Bratt et al. |
| 5,742,277 A | | 4/1998 | Gossett et al. |
| 5,812,147 A | | 9/1998 | Van Hook et al. |
| 5,832,288 A | | 11/1998 | Wong |
| 5,848,286 A | | 12/1998 | Schiffleger et al. |
| 5,864,703 A | | 1/1999 | Van Hook et al. |
| 5,887,183 A | * | 3/1999 | Agarwal et al. ................. 712/2 |
| 5,898,882 A | | 4/1999 | Kahle et al. |
| 5,931,945 A | | 8/1999 | Yung et al. |
| 5,933,157 A | | 8/1999 | Van Hook et al. |
| 5,933,650 A | | 8/1999 | Van Hook et al. |
| 5,938,756 A | | 8/1999 | Van Hook et al. |
| 5,946,496 A | | 8/1999 | Sugumar et al. |
| 5,954,815 A | | 9/1999 | Joshi et al. |
| 5,982,939 A | | 11/1999 | Van Hook |
| 6,006,315 A | | 12/1999 | Park |
| 6,058,465 A | | 5/2000 | Nguyen |
| 6,075,906 A | | 6/2000 | Fenwick et al. |
| 6,098,162 A | | 8/2000 | Schiffleger et al. |
| 6,141,673 A | | 10/2000 | Thayer et al. |
| 6,166,748 A | | 12/2000 | Van Hook et al. |
| 6,167,507 A | | 12/2000 | Mahalingaiah et al. |
| 6,304,963 B1 | * | 10/2001 | Elwood ...................... 712/244 |

OTHER PUBLICATIONS

IBM, "PowerPC 740 and PowerPC 750 RISC Microprocessor Family User Manual", 1998.

MIPS Technologies, Inc., Silicon Graphics Introduces Enhanced MIPS® Architecture to Lead the Interactive Digital Revolution—Future Digital Media Processors Will Enable New World of High-Performance and Low-Cost Interactive Digital Applications, 1996.

Web Extension I: Survey of RISC Architectures.

MIPS V Instruction Set.

MIPS Extension for Digital Media with 3D.

IEEE, "Subword Parallelism With MAX-2", 1996.

Web Extension I: Survey of RISC Architectures, 1997.

MIPS V Instruction Set, 1996.

MIPS Extension for Digital Media with 3D, 1996.

IBM. PowerPC™ Microprocessor Family: The Programming Environments for 32-Bit Microprocessors. Hopewell Junction, NY: IBM Corporation © Feb. 21, 2000, pp. 4-28 to 4-41.

* cited by examiner

Fig. 1A (Prior Art)
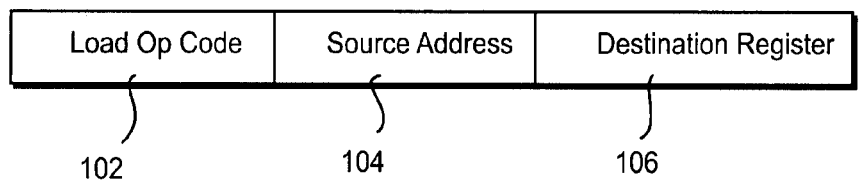
Fig. 1B (Prior Art)
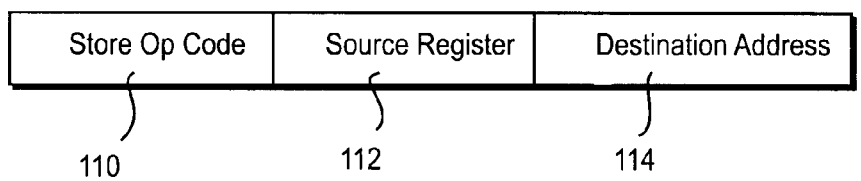
Fig. 2 (Prior Art)

HID2 register bit settings

| Bit(s) | Name | Description |
|---|---|---|
| 0 | LSQE | Load/Store quantized enable (non-indexed format)<br>0 psq_l[u] and psq_st[u] instructions are illegal<br>1 psq_l[u] and psq_st[u] instructions can be used |
| 1 | WBE | Write buffer enable<br>0 write buffer is disabled<br>1 write buffer enabled to gather non-cacheable data |
| 2 | PSE | Paired singles enabled<br>0 paired singles instructions are illegal<br>1 paired singles instructions can be used |
| 3 | LCE | Locked cache enable<br>0 Cache is not partitioned - 32 kB of normal cache<br>1 Cache is partitioned - 16 kB of normal cache and 16 kB of locked cache available |
| 4-7 | DMAQL | DMA queue length (read only)<br>the number of used queue positions in the DMA from 0 (queue empty) to 15 (queue full) |
| 8-31 | - | Reserved |

*Fig. 4*

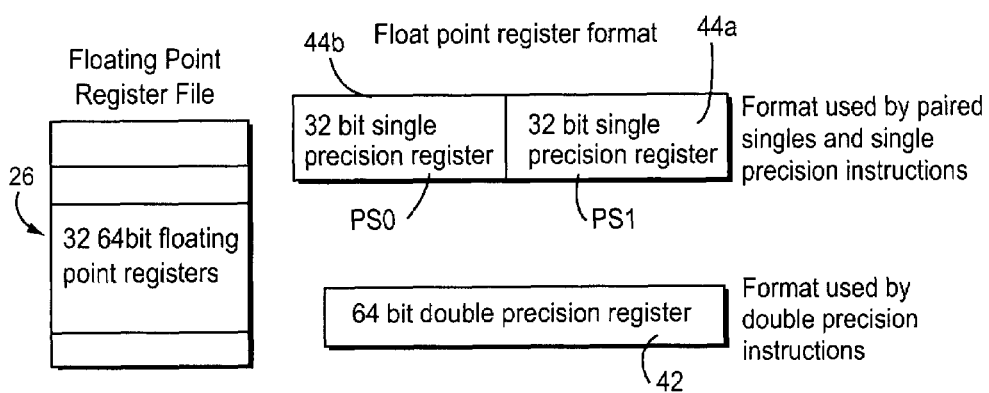

*Fig. 5* psq_1
Paired Single Quantized Load
psq_1   frD,d(rA),W,IDX psq_st
Paired Single Quantized Store
psq_st   frS,d(rA),W,IDX

METHOD AND APPARATUS FOR EFFICIENT LOADING AND STORING OF VECTORS

CROSS-REFERENCE TO RELATED APPLICATIONS

This application is a continuation of application Ser. No. 09/918,524, filed Aug. 1, 2001, now abandoned, which is a continuation of application Ser. No. 09/545,183, filed Apr. 7, 2000, now U.S. Pat. No. 6,701,424, the entire contents of which are hereby incorporated by reference in this application.

This application is related to U.S. application Ser. No. 09/545,182, entitled "METHOD AND APPARATUS FOR OBTAINING A SCALAR VALUE DIRECTLY FROM A VECTOR REGISTER", now U.S. Pat. No. 6,857,061, and U.S. application Ser. No. 09/545,184, entitled "METHOD AND APPARATUS FOR SOFTWARE MANAGEMENT OF ON-CHIP CACHE", now U.S. Pat. No. 6,859,862, filed by the same inventors on the same date as the instant application. Both of these related cases are hereby incorporated by reference in their entirety.

FIELD OF THE INVENTION

This invention relates to information processors, such as microprocessors, and, more particularly, to a method and apparatus which improves the operation of information processors having a vector processing unit by increasing the efficiency at which vectors are loading to registers and stored in memory.

BACKGROUND OF THE INVENTION

The electronic industry is in a state of evolution spurred by the seemingly unquenchable desire of the consumer for better, faster, smaller, cheaper and more functional electronic devices. In their attempt to satisfy these demands, the electronic industry must constantly strive to increase the speed at which functions are performed by data processors. Videogame consoles are one primary example of an electronic device that constantly demands greater speed and reduced cost. These consoles must be high in performance and low in cost to satisfy the ever increasing demands associated therewith. The instant invention is directed to increasing the efficiency at which certain vectors are loaded in registers and stored to memory, as well as to decreasing the amount of memory required to store certain vectors.

Microprocessors typically have a number of execution units for performing mathematical operations. One example of an execution unit commonly found on microprocessors is a fixed point unit (FXU), also known as an integer unit, designed to execute integer (whole number) data manipulation instructions using general purpose registers (GPRs) which provide the source operands and the destination results for the instructions. Integer load instructions move data from memory to GPRs and store instructions move data from GPRs to memory. An exemplary GPR file may have 32 registers, wherein each register has 32 bits. These registers are used to hold and store integer data needed by the integer unit to execute integer instructions, such as an integer add instruction, which, for example, adds an integer in a first GPR to an integer in a second GPR and then places the result thereof back into the first GPR or into another GPR in the general purpose register file.

Another type of execution unit found on most microprocessors is a floating point unit (FPU), which is used to execute floating point instructions involving non-integers or floating point numbers. Floating point numbers are represented in the form of a mantissa and an exponent, such as $6.02 \times 10^3$. A floating point register file containing floating point registers (FPRs) is used in a similar manner as the GPRs are used in connection with the fixed point execution unit, as explained above. In other words, the FPRs provide source operands and destination results for floating point instructions. Floating point load instructions move data from memory to FPRs and store instructions move data from FPRs to memory. An exemplary FPR file may have 32 registers, wherein each register has 64 bits. These registers are used to hold and store floating point data needed by the floating point execution unit (FPU) to execute floating point instructions, such as a floating point add instruction, which, for example, adds a floating point number in a first FPR to a floating point number in a second FPR and then places the result thereof back into the first FPR or into another FPR in the floating point register file.

Microprocessor having floating point execution units typically enable data movement and arithmetic operations on two floating point formats: double precision and single precision. In the example of the floating point register file described above having 64 bits per register, a double precision floating point number is represented using all 64 bits of the FPR, while a single precision number only uses 32 of the 64 available bits in each FPR. Generally, microprocessors having single precision capabilities have single precision instructions that use a double precision format.

For applications that perform low precision vector and matrix arithmetic, a third floating point format is sometimes provided which is known as paired singles. The paired singles capability can improve performance of an application by enabling two single precision floating point values to be moved and processed in parallel, thereby substantially doubling the speed of certain operations performed on single precision values. The term "paired singles" means that the floating point register is logically divided in half so that each register contains two single precision values. In the example 64-bit FPR described above, a pair of single precision floating point numbers comprising 32 bits each can be stored in each 64 bit FPR. Special, instructions are then provided in the instruction set of the microprocessor to enable paired single operations which process each 32-bit portion of the 64 bit register in parallel. The paired singles format basically converts the floating point register file to a vector register file, wherein each vector has a dimension of two. As a result, part of the floating point execution unit becomes a vector processing unit (paired singles unit) in order to execute the paired singles instructions.

Some information processors, from microprocessors to supercomputers, have vector processing units specifically designed to process vectors. Vectors are basically an array or set of values. In contrast, a scalar includes only one value, such as a single number (integer or non-integer). A vector may have any number of elements ranging from 2 to 256 or more. Supercomputers typically provide large dimension vector processing capabilities. On the other hand, the paired singles unit on the microprocessor described above involves vectors with a dimension of only 2. In either case, in order to store vectors for use by the vector processing unit, vector registers are provided which are similar to those of the GPR and FPR register files as described above, except that the register size typically corresponds to the dimension of the vector on which the vector processing unit operates. For example, if the vector includes 64 values (such as integers or floating point numbers) each of which require 32 bits, then each vector register will have 2048 bits which are logically divided into 64 32-bit sections. Thus, in this example, each vector register is capable of storing a vector having a dimension of 64. FIG. 2 shows an exemplary vector register file 116 storing four 64 dimension vectors A, B, C and D.

A primary advantage of a vector processing unit with vector register as compared to a scalar processing unit with scalar registers is demonstrated with the following example: Assume vectors A and B are defined to have a dimension of 64, i.e. $A=(A_0 \ldots A_{63})$ and $B=(B_0 \ldots B_{63})$. In order to perform a common mathematical operation such as an add operation using the values in vectors A and B, a scalar processor would have to execute 64 scalar addition instructions so that the resulting vector would be $R=((A_1+B_1) \ldots (A_{63}+B_{63}))$. Similarly, in order to perform a common operation known as Dot_Product, wherein each corresponding value in vectors A and B are multiplied together and then each element in the resulting vector are added together to provide a resultant scalar, 128 scalar instructions would have to be performed (64 multiplication and 64 addition). In contrast, in vector processing a single vector addition instruction and a single vector Dot_Product instruction can achieve the same result. Moreover, each of the corresponding elements in the vectors can be processed in parallel when executing the instruction. Thus, vector processing is very advantageous in many information processing applications.

One problem, however, that is encountered in vector processing, is that sometimes the nature of the vector data used by a particular application does not correspond to the typical vector for which the vector registers are designed. Specifically, the data used by a particular application may have less data values (i.e. a smaller dimension of actual data) in each vector than the total number of data values that the vector register can hold and for which the vector load and store instruction are designed. For example, a particular application may use vectors having only 30 real data values (i.e. $A_0$ to $A_{29}$), while the vector processing unit may be designed to operate on vectors having a dimension of 64 (i.e. $A_0$ to $A_{64}$). In order to properly execute vector load and store instructions, the vector registers must have 64 data values. As a result, even if the actual data for a particular application has only 30 data values, the vector register must still be loaded with 64 data values from memory. Thus, constants, such as a zeros, are loaded from memory into the lower order locations in the vector register that do not contain actual data (e.g. $A_{30}$-$A_{63}$). Moreover, when storing such a vector to memory, the actual data as well as the appended zeros must be stored to memory in order to comprise a complete vector of 64 data values. In other words, significant inefficiencies occur in vector processing when the actual data does not fill the entire vector, due to the fact that filler data, such as zeros, must be loaded along with the actual data in the vector register in order to completely fill the register. In addition, the filler data, which is not actual or useful data, must be stored to memory with the actual data when the vector register is stored to memory. Loading and storing all of the filler data (zeros in this example) constitutes a significant waste of bus bandwidth. In addition, this situation results in a significant waste of memory by having to store the filler data in memory as part of the vector.

As can be seen in FIG. 1a, the typical format for a vector load instruction 100 includes a primary op-code 102, a source address 104, and a destination register indicator 106. The primary op-code identifies the particular type of instruction, which in this instance is a vector load instruction. The op code may, for example, comprise the most significant 6 bits (bits 0-5) of the instruction. The source address 104 provides the particular address of the location in memory where the subject vector to be loaded by the instruction is located. The destination register indicator 106 provides the particular vector register in the vector register file in which the subject vector is to be loaded. It is noted that the vector load instruction format 100 of FIG. 1a is only exemplary and that prior art vector load instructions may have other formats and/or include other parts, such as a secondary op-code, status bits, etc., as one skilled in the art will readily understand. However, as explained above, regardless of the particular format of the instruction, the instruction still requires that a complete vector be loaded from memory to the vector register. Thus, in the above example, all 64 vector register locations must be loaded with data from memory, regardless of how many actual or real data values exist. Thus, for the conventional instruction format shown in FIG. 1a, the memory must contain 64 data values, regardless of the actual number of real data values.

Similarly, as can be seen in FIG. 1b, a typical vector store instruction 108 includes a primary op code 110, source register indicator 112, and a destination address 114. The primary op-code identifies the particular type of instruction, which in this instance is a vector store instruction. The op code may, for example, comprise the most significant 6 bits (bits 0-5) of the instruction. The source register 112 provides the particular vector register in the vector register file which is to be stored to memory by the instruction. The destination address 114 provides the particular address in memory where the vector is to be stored by the instruction. It is noted that the vector store instruction format 108 of FIG. 1b is only exemplary and that prior art vector store instructions may have other formats and/or include other parts, such as a secondary op-code, status bits, etc., as one skilled in the art will readily understand. However, as explained above, regardless of the particular format of the instruction, the instruction still requires that a complete vector be stored to memory. Thus, in the above example, all 64 vector register locations would be stored to memory, regardless of how many actual or real data values exist in the vector.

As explained above, the conventional load and store instructions do not operate efficiently when the actual data does not correspond to the vector size is defined for a particular vector processing unit. Accordingly, a need exists for improving vector load and store instructions for cases in which the actual data values do not fill the entire vector, so that the operations associated therewith can be performed faster and more efficiently and so that less memory can be used.

SUMMARY OF THE INVENTION

The instant invention provides a mechanism and a method for enabling vector load and store instructions to execute more efficiently and with less memory usage by eliminating the need to load useless data from memory into vector registers and to store that same useless data in memory. The invention provides an improved instruction format which may be used in connection with any suitable type of data processor, from microprocessors to supercomputers, having a vector processing unit in order to improve the operational efficiency of vector load and store instructions in instances where the entire vector is not needed to store the data for a particular application.

In accordance with the invention, the improved vector load and store instruction formats have an embedded bit or a plurality of embedded bits that identify the end of the useful data in the vector which is the subject of the instruction. In this way, the load/store unit of the data processor can use the information provided by the embedded bit(s) to load only the actual data into the vector register, and to store only the actual data to memory. Thus, the improved instruction format eliminates the need to load filler data, such as zeros, from memory and to store the filler data to memory.

In accordance with a preferred embodiment of the invention, the improved load instruction format includes a primary op code, a source address, at least one position bit which indicates the end of the useful data in the vector, a value field providing a constant that is used by the load/store unit to set the remaining vector register locations to the constant, and a destination register indicator which provides the particular vector register in the vector register file that is to be loaded. Using this load instruction format enables the load/store unit (LSU) to only load the useful data from memory and to set the remaining vector locations to the constant.

In accordance with a preferred embodiment of the invention, the improved store instruction format includes a primary op code, a source register indicator which provides the particular vector register that is to be stored, at least one position bit that indicates the end of the useful data in the vector register, and a destination address in memory where the vector is to be stored. Using this store instruction format enables the load/store unit (LSU) to only store the useful data in the vector register to memory, thereby eliminating the need to store the constants or filler data present in the vector register.

The number of bits needed to indicate the end of the useful data within a particular vector depends on the particular dimension of the vector involved. For example, if the vector has a dimension of 64, then six bits are needed to provide a unique identifier for particular ending location of the useful data in the vector. In other words, if the dimension of the vector is $2^n$, then n bits are needed, in this embodiment, to indicate the ending location of the useful data.

In another embodiment of the improved load and store instructions of the instant invention, the position bit(s) and the value field are essentially combined into one bit which controls whether the entire vector register or just a portion thereof is loaded and stored, respectively. It is noted, however, that the invention is not limited to any particular implementation of the location indicator and the value field. Instead, the invention covers any suitable way in which the location of the end of the useful data within the vector can be represented or embedded in the bit format comprising the instruction, as well as any suitable way in which the load instruction can indicate to the load/store unit that a particular constant should be used in setting the unused elements in the vector register.

In a preferred embodiment, the invention is implemented on a microprocessor, such as the microprocessors in IBM's PowerPC (IBM™) family of microprocessors (hereafter "PowerPC"), wherein the microprocessor has been modified or redesigned to include a vector processing unit, such as a paired singles unit. For more information on the PowerPC microprocessors see *PowerPC 740 and PowerPC 750 RISC Microprocessor Family User Manual, IBM* 1998 and *PowerPC Microprocessor Family: The Programming Environments, Motorola Inc.* 1994, both of which are hereby incorporated by reference in their entirety.

In the modified PowerPC example described above, the paired singles operation may be selectively enabled by, for example, providing a hardware implementation specific special purpose register (e.g. HID2) having a bit (e.g. $3^{rd}$ bit) which controls whether paired single instructions can be executed. Other bits in the special purpose register can be used, for example, to control other enhancement options that may be available on the microprocessor.

The invention also provides specific instruction definitions for paired singles load and store instructions. The invention is also directed to a decoder, such as a microprocessor or a virtual machine (e.g. software implemented hardware emulator), which is capable of decoding any of all of the particular instructions disclosed herein. The invention further relates to a storage medium which stores any or all of the particular instructions disclosed herein.

BRIEF DESCRIPTION OF THE DRAWINGS

Other objects, features and advantages of the instant invention will become apparent upon review of the detailed description below when read in conjunction with the accompanying drawings, in which:

FIG. 1a shows a format of a conventional vector load instruction for loading a vector from memory into a vector register file;

FIG. 1b shows a format of a conventional vector store instruction for storing a vector from a vector register to memory;

FIG. 2 shows an exemplary representation of a vector register file;

FIG. 4 is a table showing the definition of an exemplary special purpose register (HID2) used to control paired single operation of the vector processing unit, as well as other optional enhancements to the microprocessor of FIG. 3, in accordance with one embodiment of the instant invention;

FIG. 5 is an illustration of the floating point register file of the microprocessor of FIG. 3, wherein two possible floating point formats for the registers are shown;

DETAILED DESCRIPTION OF THE PREFERRED EMBODIMENTS

In the following description, numerous specific details are set forth regarding a preferred embodiment of the instant invention. However, the specific details are meant to be exemplary only and are not meant to limit the invention to the particular embodiment described herein. In other words, numerous changes and modifications may be made to the described embodiment without deviating from the true scope and spirit of the instant invention, as a person skilled in the art will readily understand from review of the description herein.

Figure 3:
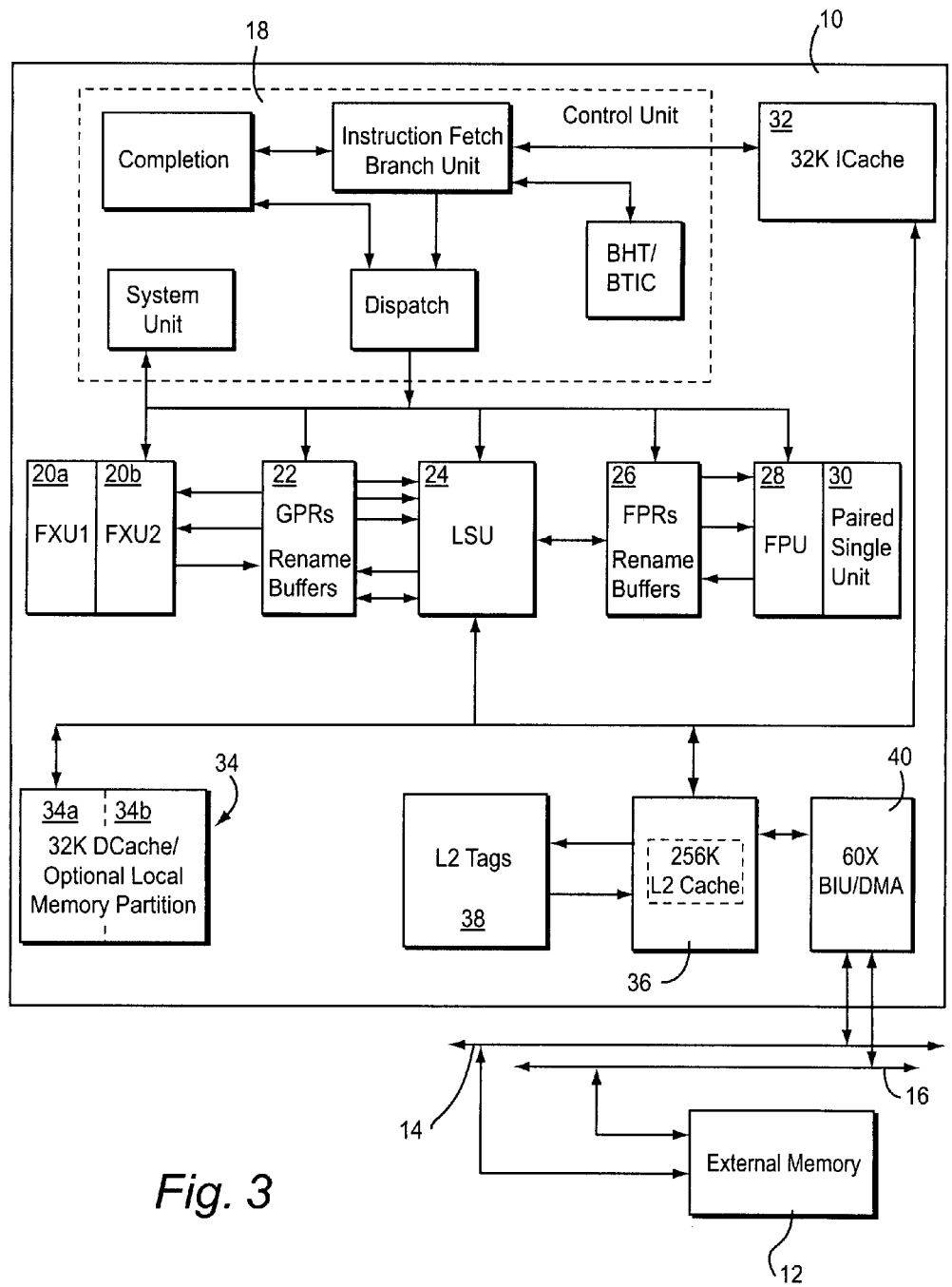
FIG. 3 shows an exemplary microprocessor and external memory which can be used to implement the instant invention.

FIG. 3 is a diagram of a single-chip microprocessor 10 in which the present invention has been implemented, in accordance with one exemplary embodiment of the instant invention. It is noted that FIG. 3 only shows a simplified representation of a microprocessor, due to that fact that the majority of the elements in the microprocessor, as well as their interconnection and operation, are well known to one skilled in the art. Thus, in order not to obscure the instant invention with details regarding known elements, the drawings and description herein are presented in a simplified form and only to the extent necessary to provide a full understanding of the instant invention for a person skilled in the art.

The microprocessor 10 is connected, in a known manner, to an off-chip (external) memory 12 or main memory via an address bus 14 and data bus 16. The external memory 12 contains data and/or instructions, such as 3D graphics instructions, needed by the microprocessor 10 in order perform desired functions. It is noted that the microprocessor 10 and external memory 12 may be implemented in a larger overall information processing system (not shown). The microprocessor includes a control unit 18, fixed point units 20a and 20b, general purpose registers (GPRs) 22, a load and store unit 24, floating point unit 28, paired singles unit (vector processing unit) 30 and floating point registers 26, all of which generally interconnect and operate in a known manner. In addition, the microprocessor 10 includes a level one instruction cache 32, a level one data cache 34, a level two cache 36 with associated tags 38, and bus interface unit (BIU) 40, all of which may generally operate in a conventional manner. However, the data cache 34 and the direct memory access unit may have special operations as disclosed in copending U.S. patent application Ser. No. 09/545,181 entitled "Method and Apparatus for Software Management of On-Chip Cache" and filed concurrently herewith by the same inventors and assignees. For additional information on cache instructions for the PowerPC see *Zen and the Art of Cache Maintenance, Byte Magazine*, March 1997.

The structure and operation of this exemplary microprocessor 10 is similar to IBM's PowerPC microprocessors, with certain modifications to implement the instant invention. Details regarding the operation of most of the elements of this exemplary microprocessor are found in the following publications: *PowerPC 740 and PowerPC 750 RISC Microprocessor Family User Manual*, IBM 1998 and *PowerPC Microprocessor Family: The Programming Environments*, Motorola Inc. 1994. It is noted, however, that the instant invention may be implemented on any suitable data processor, from a microprocessor to a supercomputer, to improve vector loading and storing for certain applications.

As indicted above, this exemplary microprocessor 10 is an implementation of the PowerPC microprocessor family of reduced instruction set computer (RISC) microprocessors with extensions to improve the floating point performance, in accordance with the instant invention. The following provides a general overview of the operation of this exemplary microprocessor 10 and is not intended to limit the invention to any specific feature described.

The exemplary microprocessor 10 implements the 32-bit portion of the PowerPC architecture, which provides 32-bit effective addresses, integer data types of 8, 16, and 32 bits, and floating-point data types of single- and double-precision. In addition, the microprocessor extends the PowerPC architecture with the paired single-precision floating point data type and a set of paired single floating point instructions, as will be described in greater detail below. The microprocessor 10 is a superscalar processor that can complete two instructions simultaneously. It incorporates the following five main execution units: 1) floating-point unit (FPU) 28; 2) branch processing unit or control unit 18; 3) System register unit (SRU) (not shown); 4) Load/store unit (LSU) 24; and 5) Two integer units (FXUs) 20a and 20b, wherein FXU1 executes all integer instructions and FXU2 executes all integer instructions except multiply and divide instructions. The ability to execute several instructions in parallel and the use of simple instructions with rapid execution times yield high efficiency and throughput for systems using this exemplary microprocessor. Most integer instructions execute in one clock cycle.

The FPU is preferably pipelined such that it breaks the tasks it performs into subtasks, and then executes in three successive stages. Typically, a floating-point instruction can occupy only one of the three stages at a time, freeing the previous stage to work on the next floating-point instruction. Thus, three single- or paired single-precision floating-point instructions can be in the FPU execute stage at a time. Double-precision add instructions have a three-cycle latency; double-precision multiply and multiply-add instructions have a four-cycle latency.

FIG. 3 shows the parallel organization of the execution units. The control unit 18 fetches, dispatches, and predicts branch instructions. It is noted that this is a conceptual model that shows basic features rather than attempting to show how features are implemented physically. The microprocessor 10 has independent on-chip, 32 Kbyte, eight-way set-associative, physically addressed caches for instructions and data and independent instruction and data memory management units. The data cache can be selectively configured as a four-way 16 KByte locked cache (software controlled) and a four-way 16 KByte normal cache. Each memory management unit has a 128-entry, two-way set-associative translation lookaside buffer that saves recently used page address translations. Block address translation (BAT) is done through four-entry instruction and data block address translation arrays, defined by the PowerPC architecture. During block translation, effective addresses are compared simultaneously with all four BAT entries. The L2 cache is implemented with an on-chip, two-way set-associative tag memory 38, and an on-chip 256 Kbyte SRAM 36 with ECC for data storage. The microprocessor 10 preferably has a direct memory access (DMA) engine to transfer data from the external memory 12 to the optional locked data cache 34b and to transfer data from the locked data cache to the external memory. A write gather pipe is preferably provided for efficient non-cacheable store operations.

The microprocessor 10 has a 32-bit address bus and a 64-bit data bus. Multiple devices compete for system resources through a central external arbiter. The microprocessor's three-state cache-coherency protocol (MEI) supports the modified, exclusive and invalid states, a compatible subset of the to MESI (modified/exclusive/shared/invalid) four-state protocol, and it operates coherently in systems with four-state caches. The microprocessor supports single-beat and burst data transfers for external memory accesses and memory-mapped I/O operations.

In the exemplary embodiment of FIG. 3, the microprocessor includes separate 32-Kbyte, eight-way associative instruction and data caches (32 and 34) to allow the various execution units (18, 20a, 20b, 28 and 30) and registers rapid access to instructions and data, thereby reducing the number of relatively slow accesses to the external memory 12. The caches preferably implement a pseudo least-recently-used (PLRU) replacement algorithm for managing the contents of the caches. The cache directories are physically addressed, the physical (real) address tag being stored in the cache directory. Both the instruction and data caches have 32-byte cache block size, wherein a cache block is the block of memory that a coherency state describes (also referred to as a cache line). Two coherency state bits for each data cache block allow encoding for three states—Modified (exclusive) (M), Exclusive (unmodified) (E), and Invalid (I)—thereby defining an MEI three-state cache coherency protocol. A single coherency state bit for each instruction cache block allows encoding for two possible states: invalid (LINV) or Valid (VAL). In accordance with the instant invention, each cache can be invalidated or locked by setting the appropriate bits in a hardware implementation-dependent register (a special purpose register described in detail below).

The microprocessor 10 preferably supports a fully-coherent 4-Gbyte physical address space. Bus snooping is used to drive the MEI three-state cache coherency protocol that ensures the coherency of global memory with respect to the processor's data cache. The data cache 34 coherency protocol is a coherent subset of the standard MESI four-state cache protocol that omits the shared state. The data cache 34 characterizes each 32-byte block it contains as being in one of three MEI states. Addresses presented to the cache are indexed into the cache directory with bits A(20-26), and the upper-order 20 bits from the physical address translation (PA(0-19)) are compared against the indexed cache directory tags. If neither of the indexed tags matches, the result is a cache miss (required data not found in cache). On a cache miss, the microprocessor cache blocks are filled in four beats of 64 bits each. The burst fill is performed as a critical-double-word-first operation—the critical double word is simultaneously written to the cache and forwarded to the requesting unit, thus minimizing stalls due to cache fill latency. If a tag matches, a cache hit occurred and the directory indicates that state of the cache block through two state bits kept with the tag. The microprocessor 10 preferably has dedicated hardware to provide memory coherency by snooping bus transactions.

Both caches 32 and 34 are preferably tightly coupled into the bus interface unit (BUI) 40 to allow efficient access to the system memory controller and other potential bus masters. The BUI 40 receives requests for bus operations from the instruction and data caches and executes operations per the 60x bus protocol. The BUI 40 provides address queues, prioritizing logic and bus control logic. The BUI also captures snoop addresses for data cache, address queue and memory reservation operations. The data cache is preferably organized as 128 sets of eight ways, wherein each way consists of 32 bytes, two state bits and an address tag. In accordance with the instant invention, an additional bit may be added to each cache block to indicate that the block is locked. Each cache block contains eight contiguous words from memory that are loaded from an eight-word boundary (i.e., bits A(27-31) of the logical (effective) addresses are zero). As a result, cache blocks are aligned with page boundaries. Address bits A(20-26) provide the index to select a cache set. Bits A(27-31) select a byte within a block. The on-chip data cache tags are single ported, and load or store operations must be arbitrated with snoop accesses to the data cache tags. Load and store operations can be performed to the cache on the clock cycle immediately following a snoop access if the snoop misses. Snoop hits may block the data cache for two or more cycles, depending on whether a copy-back to main memory 12 is required.

The level one (L1) caches (32 and 34) are preferably controlled by programming specific bits in a first special purpose register (HID0—not shown) and by issuing dedicated cache control instructions. The HID0 special purpose register preferably contains several bits that invalidate, disable, and lock the instructions and data caches. The data cache 34 is automatically invalidated when the microprocessor 10 is powered up and during a hard reset. However, a soft reset does not automatically invalidate the data cache. Software uses the HID0 data cache flash invalidate bit (HID0(DCFI)) if the cache invalidation is desired after a soft reset. Once the HID0 (DCFI) is set through move-to-special-purpose-register (mtspr) operation, the microprocessor automatically clears this bit in the next clock cycle (provided that the data cache is enabled in the HID0 register).

The data cache may be enabled or disabled by using the data cache enable bit (HID0(DCE)) which is cleared on power-up, disabling the data cache. When the data cache is in the disabled state (HID0(DCE)=0), the cache tag state bits are ignored, and all accesses are propagated to the L2 cache 36 or 60x bus as single beat transactions. The contents of the data cache can be locked by setting the data cache lock bit (HID0 (DLOCK)). A data access that hits in a locked data cache is serviced by the cache. However, all accesses that miss in the locked cache are propagated to the L2 cache 36 or 60x bus as single-beat transactions. The microprocessor 10 treats snoop hits in the locked data cache the same as snoop hits in an unlocked data cache. However, any cache block invalidated by a snoop remains invalid until the cache is unlocked. The instruction cache 32 operates in a similar manner as the data cache described above, except that different bits are used in the HID0 register for invalidation and locking, i.e. instruction cache flash invalidate bit HID0(ICFI) and instruction cache lock bit HID0(ILOCK).

The microprocessor 10 preferably includes another hardware implementation-dependent special purpose register (HID2) that, in accordance with the instant invention, is used to enable the floating point unit to operate in paired singles mode, i.e. enables the 64-bit FPRs to be treated as a pair of 32-bit registers containing two single precision floating point numbers. Specifically, the HID2 register contains a paired singles enable bit (PSE) that is used to enable paired singles operation. An example definition for the HID2 register is shown in FIG. 4, wherein bit number 2 is the PSE bit for controlling paired single format. The other bits in the HID2 register are used to control other enhanced features that may be provided in the microprocessor 10, such as data quantization, locked cache, write buffering, and DMA queue length as shown on FIG. 4. It is noted that, while FIG. 2 shows that bits 8-31 of the HID2 register are reserved, these bits may be used to indicate, for example, cache instruction hit error, DMA access to normal cache error, DMA cache miss error, DMA queue length overflow error, instruction cache hit error enable, DMA cache miss error enable, and DMA queue overflow error enable.

When the HID2(PSE) bit is set to 1, paired singles instructions can be used. Thus, the floating point unit 28 of microprocessor 10 includes a paired singles unit 30 for processing the two dimensional vectors defined by paired singles. In other words, the microprocessor 10 has the ability to perform vector processing as described above, wherein the dimension of the vector is two. A floating point status and control register (FPSCR) is also provided which contains floating point exception signal bits, exception summary bits, exception enable bits, and rounding control bits needed for compliance with the IEEE standard.

Thus, in addition to single- and double-precision operands, when HID2(PSE)=1, the microprocessor 10 supports a third format: paired singles. As shown in FIG. 5, the 64-bit registers in the floating point register file 26, which typically are treated as a single 64-bit register 42, are converted to a pair of 32 bit registers 44a and 44b each being operable to store a single precision (32-bit) floating point number. The single-precision floating point value in the high order word is referred to herein as ps0, while the single-precision floating point value in the low order word is referred to herein as ps1. Special instructions are provided in the instruction set of the microprocessor 10 for manipulating these operands which allow both values (ps0 and ps1) be processed in parallel in the paired singles unit 30. For example, a paired single multiply-add instruction (ps_madd) instruction may be provided that multiplies ps0 in frA by ps0 in frC, then adds it to ps0 in frB to get a result that is placed in ps0 in frD. Simultaneously, the same operations are applied to the corresponding ps1 values. Paired single instructions may be provided which perform an operation comparable to one of the existing double-precision instructions in provided in the PowerPc instruction set. For example, a fadd instruction adds double-precision operands from two registers and places the result into a third register. In the corresponding paired single instruction, ps_add, two such operations are performed in parallel, one on the ps0 values, and one on the ps1 values.

Most paired single instructions produce a pair of result values. The Floating-Point Status and Control Register (FPSCR) contains a number of status bits that are affected by the floating-point computation. FPSCR bits 15-19 are the result bits. They may be determined by the result of the ps0 or the ps1 computation. When in paired single mode (HID2 (PSE)=1), all the double-precision instructions are still valid, and execute as in non-paired single mode. In paired single mode all the single-precision floating-point instructions) are valid, and operate on the ps0 operand of the specified registers.

In accordance with a preferred embodiment of the microprocessor of FIG. 3, in order to move data efficiently between the CPU and memory subsystems, certain load and store instructions can preferably implicitly convert their operands between single precision floating point and lower precision, quantized data types. Thus, in addition to the floating-point load and store instructions defined in the PowerPC architecture, the microprocessor 10 preferably includes eight additional load and store instructions that can implicitly convert their operands between single-precision floating-point and lower precision, quantized data types. For load instructions, this conversion is an inverse quantization, or dequantization, operation that converts signed or unsigned, 8 or 16 bit integers to 32 bit single-precision floating-point operands. This conversion takes place in the load/store unit 24 as the data is being transferred to a floating-point register (FPR). For store instructions, the conversion is a quantization operation that converts single-precision floating-point numbers to operands having one of the quantized data types. This conversion takes place in the load/store unit 24 as the data is transferred out of an FPR. The load and store instructions for which data quantization applies are for paired single operands, and so are valid only when HID2(PSE)=1. These new load and store instructions cause an illegal instruction exception if execution is attempted when HID2(PSE)=0. Furthermore, the nonindexed forms of these loads and stores (psq_l(u) and psq_st(u)) are illegal unless HID2(LSQE)=1 as well (see FIG. 4). The quantization/dequantization hardware in the load/store unit assumes big-endian ordering of the data in memory. Use of these instructions in little-endian mode will give undefined results. Whenever a pair of operands are converted, they are both converted in the same manner. When operating in paired single mode (HID2(PSE)=1), a single-precision floating-point load instruction will load one single-precision operand into both the high and low order words of the operand pair in an FPR. A single-precision floating-point store instruction will store only the high order word of the operand pair in an FPR preferably, two paired single load (psq_l, psq_lu) and two paired single store (psq_st, psq_stu) instructions use a variation of the D-form instruction format. Instead of having a 16 bit displacement field, 12 bits are used for displacement, and the remaining four are used to specify whether one or two operands are to be processed (the 1 bit W field) and which of eight graphics quantization registers (GQRs) is to be used to specify the scale and type for the conversion (a 3 bit I or IDX field). Two remaining paired single load (psq_lx, psq_lux) and the two remaining paired single store (psq_stx, psq_stux) instructions use a variation of the X-form instruction format. Instead of having a 10 bit secondary op code field, 6 bits are used for the secondary op code, and the remaining four are used for the W field and the I field.

An exemplary dequantization algorithm used to convert each integer of a pair to a single-precision floating-point operand is as follows:

1. read integer operand from L1 cache;
2. convert data to sign and magnitude according to type specified in the selected GQR;
3. convert magnitude to normalized mantissa and exponent;
4. subtract scaling factor specified in the selected GQR from the exponent; and
5. load the converted value into the target FPR.

For an integer value, I, in memory, the floating-point value F, loaded into the target FPR, is $F=I*2**(-S)$, where S is the twos compliment value in the LD_SCALE field of the selected GQR. For a single-precision floating-point operand, the value from the L1 cache is passed directly to the register without any conversion. This includes the case where the operand is a denorm.

An exemplary quantization algorithm used to convert each single-precision floating-point operand of a pair to an integer is as follows:

1. move the single-precision floating-point operand from the FPR to the completion store queue;
2. add the scaling factor specified in the selected GQR to the exponent;
3. shift mantissa and increment/decrement exponent until exponent is zero;
4. convert sign and magnitude to 2s complement representation;
5. round toward zero to get the type specified in the selected GQR;
6. adjust the resulting value on overflow; and
7. store the converted value in the L1 cache.

The adjusted result value for overflow of unsigned integers is zero for negative values, 255 and 65535 for positive values, for 8 and 16 bit types, respectively. The adjusted result value for overflow of signed integers is −128 and −32768 for negative values, 127 and 32767 for positive values, for 8 and 16 bit types, respectively. The converted value produced when the input operand is +Inf or NaN is the same as the adjusted result value for overflow of positive values for the target data type. The converted value produced when the input operand is −Inf is the same as the adjusted result value for overflow of negative values. For a single-precision floating-point value, F, in an FPR, the integer value I, stored to memory, is $I=ROUND(F*2**(S))$, where S is the twos compliment value in the ST_SCALE field of the selected GQR, and ROUND applies the rounding and clamping appropriate to the particular target integer format. For a single-precision floating-point operand, the value from the FPR is passed directly to the L1 cache without any conversion, except when this operand is a denorm. In the case of a denorm, the value 0.0 is stored in the L1 cache.

It is noted that the above data quantization feature is only optional and exemplary in accordance with the instant invention. However, its use can further improve the operation of the microprocessor 10 for certain applications.

In accordance with an important aspect of the instant invention, special paired singles load and store instructions are provided which indicate to the load/store unit where the useful data is located in the vector so that unnecessary loading and storing of filler data is avoided. More particularly, in accordance with the invention, the ending location of the useful data in the vector is embedded in the vector load and store instructions.

Figure 7:
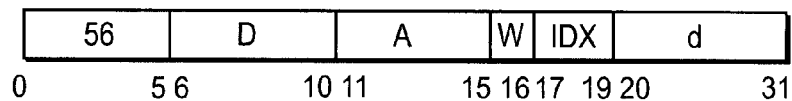
FIG. 7 shows an exemplary paired singles load instruction, in accordance with a preferred embodiment of the instant invention.
Figure 8:
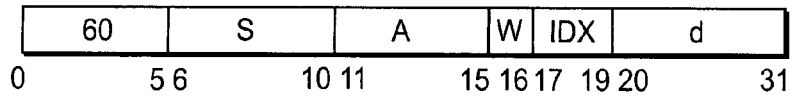
FIG. 8 shows exemplary paired singles store instruction, in accordance with a preferred embodiment of the instant invention.

FIGS. 7 and 8 show exemplary vector load and vector store instructions, respectively, in accordance with the instant invention. FIG. 7 is a paired-single-quantized-load instruction called psq_l. The instruction loads the high order word (ps0) and the low order word (ps1) in a floating point register (frD) with a pair of single precision floating point numbers. The psq_l instruction includes 32 bits, wherein bits 0-5 encode a primary op code of 56, bits 6-10 designate a floating point destination register, bits 11-15 specify a general purpose register to be used as a source, bit 16 indicates whether one or two paired singles register is to be loaded, bits 17-19 specify a graphics quantization register (GQR) to be used by the instruction, and bits 20-31 provide an immediate field specifying a signed two's compliment integer to be summed with the source to provide an effective address for memory access.

In accordance with this psq_l instruction, ps0 and ps1 in frD are loaded with a pair of single precision floating point numbers. Specifically, memory is accessed at the effective address (EA is the sum of (rA|0+d) as defined by the instruction. A pair of numbers from memory are converted as defined by the indicated GQR control register and the results are placed in ps0 and ps1. However, if W=1 then only one number is accessed from memory, converted according to the GQR and placed into ps0. When W=1, ps1 is loaded with a floating point value of 1.0 (a constant). The three bit IDX field selects one of eight 32 bit GQR control registers. From this register a LOAD_SCALE and a LD_TYPE fields are used. The LD-TYPE field defines whether the data in memory is floating point or integer format. If integer format is defined, the LD_TYPE field also defines whether each integer is 8-bits or 16-bits, signed or unsigned. The LOAD_SCALE field is applied only to integer numbers and is a signed integer that is subtracted from the exponent after the integer number from memory has been converted to floating point format.

FIG. 8 is a paired-single-quantized-store instruction called psq_st. The psq_st instruction includes 32 bits, wherein bits 0-5 encode a primary op code of 60, bits 6-10 designate a floating point source register, bits 11-15 specify a general purpose register to be used as a source, bit 16 indicates whether one or two paired singles register is to be stored, bits 17-19 specify a graphics quantization register (GQR) to be used by the instruction, and bits 20-31 provide an immediate field specifying a signed two's compliment integer to be summed with the source to provide an effective address for memory access.

In accordance with the psq_st instruction of FIG. 8, the effective address is the sum of (rA|0)+d as defined by the instruction. If W=1 only the floating point number from frS (ps0) is quantized and stored to memory starting at the effective address. If W=0 a pair of floating point numbers from frS(ps0) and frS(ps1) are quantized and stored to memory starting at the effective address. Again, the three bit IDX field (or I field) selects one of the eight 32 bit GQR control registers. From this register the STORE_SCALE and the ST_TYPE fields are used. The ST_TYPE field defines whether the data stored to memory is to be floating point or integer format. If integer format is defined, the ST TYPE field also defines whether each integer is 8-bits or 16-bits, signed or unsigned. The STORE_SCALE field is a signed integer that is added to the exponent of the floating point number before it is converted to integer and stored to memory. For floating point numbers stored to memory the addition of the STORE_SCALE field to the exponent does not take place.

It is noted that in each of the examples provided above for vector load and store instructions, a single bit (W) is used to control the load and store operations in accordance with the instant invention. However, this implementation is only exemplary and was selected in this embodiment due to the fact that the microprocessor 10 is based on the PowerPC microprocessor. Thus, the W bit is used in this example because it was the most convenient way of implementing the invention based on the existing circuitry found in the PowerPC. Thus, depending of the particular implementation of the invention, the manner in which the bits of the instruction indicate where the useful data ends in the vector may change. In other words, the ending location of the useful data may take any suitable form in the instruction, as long as the decoder thereof can identify the location to properly execute the instruction. It is noted that, in the above example, the vector has a dimension of two (paired singles) and a constant of 1.0 is always used. Thus, the invention is implemented in this example using only one bit (i.e. the W bit).

While the above embodiment of the invention describes a particular microprocessor implementation of the instant invention, the invention is in now way limited to use in a microprocessor environment. If fact, the invention is applicable to any data processor, from microprocessors to super-computers, that includes a vector processing unit, regardless of the dimension of the vectors operated thereon.

Figure 6A:
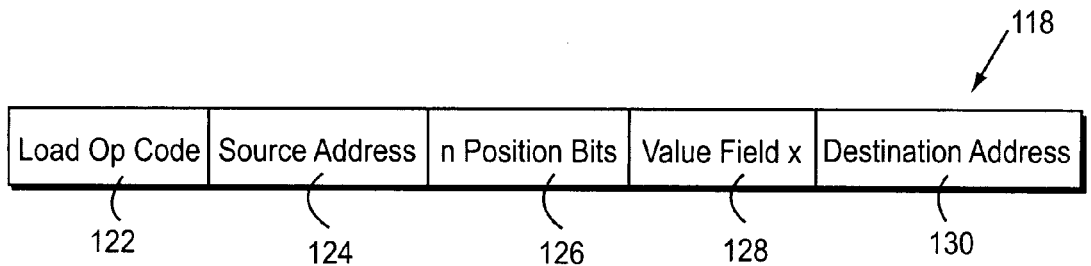
FIG. 6a shows a preferred embodiment of the format for a vector load instruction, in accordance with a preferred embodiment of the instant invention.
Figure 6B:
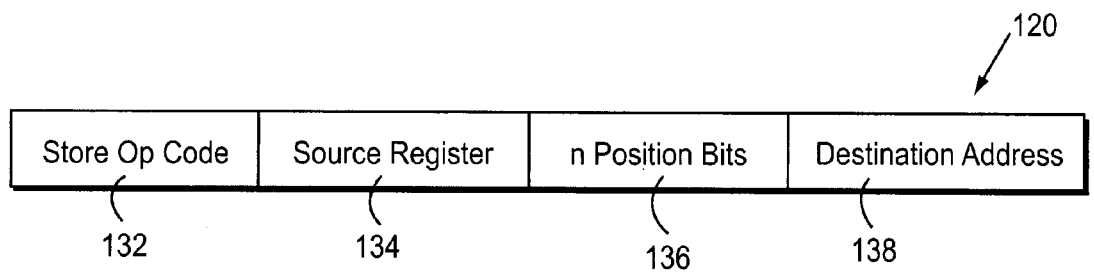
FIG. 6b shows as preferred embodiment of the format for a vector store instruction, in accordance with a preferred embodiment of the instant invention.

FIGS. 6a and 6b show exemplary general formats for a vector load instruction 118 and a vector store instructions 120, in accordance with the instant invention. As shown in FIG. 6a, this general vector load bit format includes a primary op code 122, a source address 124, position bit(s) 126, a value field 128, and a destination vector register location 130. The position bit(s) are used by the load/store unit 24 to identify where the useful data in memory beginning at the source address ends. The value field 128 provides the constant (x) that is to be used by the load/store unit for setting the vector locations beyond the end of the useful data in the vector. In other words, if the value field is a "1", then all locations in the vector register beyond the position indicated by the position bit(s) are set to "1".

When FIG. 6a is compared to FIG. 1a, a major advantage of the instant invention can be seen, i.e. the exemplary load instruction format of the instant invention (FIG. 6a) tells the load/store unit what data in memory constitutes the useful data, thereby eliminating the need to load filler data from memory as required by the prior art vector load instruction format of FIG. 1a. Thus, in accordance with the instant invention, the only the actual data is loaded from memory, regardless of the particular dimension of the vector for which the vector processing unit is designed. In other words, the improved vector load format of FIG. 6a frees bandwidth and memory by not requiring that filler data (such as zeros) be stored in memory or loaded from memory.

The value field 128 in the vector load instruction format of FIG. 6a, may designate any suitable constant, and the constant may vary depending on the particular application in which the invention is embodied. For example, a value field of "1" may be used if the vector will be involved with a multiplication operation, so as not to cause a change in the values of a vector being multiplied therewith. Similarly, a value field of "0" may be used if the vector will be used in an addition operation for the same reason explained above. However, any constant may be indicated by the value filed in accordance with the instant invention.

As shown in FIG. 6, the general vector store bit format includes a primary op code 132, a source register 134, position bit(s) 136, and a destination address 138. The position bit(s) are used by the load/store unit 24 to identify where the useful data in the vector register ends, thereby enabling only the useful data to be stored to memory.

When FIG. 6*b* is compared to FIG. 1*b*, a major advantage of the instant invention can be seen, i.e. the exemplary store instruction format of the instant invention (FIG. 6*b*) tells the load/store unit what scalars comprising the vector in the vector register constitutes the useful data, thereby eliminating the need to store the filler data to memory as required by the prior art vector load instruction format of FIG. 1*b*. Thus, in accordance with the instant invention, only the actual data is stored to memory, regardless of the particular dimension of the vector for which the vector processing unit is designed. In other words, the improved vector store format of FIG. 6*b* frees bandwidth and memory by not requiring that filler data (such as zeros) be stored in memory.

In accordance with the invention, the number of bits needed in the vector load and store instructions to indicate the ending position of the useful data depends on the particular dimension of the vector involved. For example, if the vector has a dimension of 64, then six bits are needed to provide a unique identifier for each possible ending location in the vector. In other words, if the dimension of the vector is $2^n$, then n bits are needed, in this embodiment, to indicate the ending location of the useful data in the vector.

It is noted that the invention is not limited to any of the particular embodiments shown in FIGS. 6*a*, 6*b*, 7 or 8. The invention may be implemented by using any bits in the instruction to identify the location where the useful data ends within the vector. In other words, the invention covers any type of embedding of the position bit in the vector load and store instructions regardless of the particular location or format of the position bit(s) or the instruction. The invention may also be implemented in an type of vector processing unit regardless of the type of date for which the unit is designed. For example, the invention may be used for integer vectors as well as for floating point vectors.

In accordance with a further aspect of the invention, the microprocessor 10 is considered to be a decoder and executor for the particular instructions described herein. Thus, part of the instant invention involves providing an instruction decoder and executor for the new instructions defined in the above description of the invention. The invention, however, is not limited to a hardware decoder or executor, such as a microprocessor, but also covers software decoders and executors provided by, for example, a virtual machine, such as a software emulator of the instant microprocessor. In other words, the invention also relates to software emulators that emulate the operation of the instant microprocessor by decoding and executing the particular instructions described herein. The invention further relates to a storage medium, such as a compact disk which stores any or all of the unique instructions described herein, thereby enabling a microprocessor or virtual machine to operate in accordance with the invention described herein.

As can be seen from the description above, the instant invention provides improved vector loading and storing operations that increase the speed and efficiency of such operations when the actual data for a particular application does not fill the entire vector for which the processor is designed. The invention reduces memory requirements and prevents the wasting of bandwidth for applications in which the useful data does not require the entire vector. As a result, the invention reduces the overhead and improves the speed at which vector load and store instructions can be executed in connection with a vector processing unit, such as a paired singles unit or any other vector processor operating on vectors with any dimension. It is noted that the instant invention is particularly advantageous when implemented in low cost, high performance microprocessors, such as microprocessors is designed and intended for use in videogame consoles for household use or the like.

While the preferred forms and embodiments have been illustrated and described herein, various changes and modification may be made to the exemplary embodiment without deviating from the scope of the invention, as one skilled in the art will readily understand from the description herein. Thus, the above description is not meant to limit the scope of the appended claims beyond the true scope and sprit of the instant invention as defined herein.

What is claimed is:

1. A method of processing a vector stored in memory, comprising:
   providing a vector in memory;
   embedding a location identifier in bits that comprise a vector load instruction, wherein the location identifier directly identifies an ending location in the vector where useful data ends, wherein the useful data corresponds to actual data useful to a program accessing the vector, and wherein a size of the useful data is smaller than a size of the vector;
   providing a constant in the vector load instruction for use in setting the remaining locations in the vector to the constant; and
   setting remaining locations in the vector register beyond the useful data to a constant.

2. The method of claim 1, further including executing the vector load instruction to load only the useful data, designated by the location identifier, from the vector into a vector register.

3. The method of claim 1, further including designating dedicated bits in the vector load instruction which provide the location identifier.

4. The method of claim 3, wherein a dimension of the vector is $2^n$, and further including designating n bits in the vector load instruction to provide the location identifier.

5. The method of claim 1, further including using the vector load instruction in a data processor having a paired singles execution unit, wherein two single precision values constitute the vector.

6. A method of processing a vector located in a vector register, comprising:
   providing the vector in a vector register; and
   embedding a location identifier in bits that comprise a vector store instruction, wherein the location identifier directly identifies a location in the vector register where useful data ends, wherein the useful data corresponds to actual data useful to a program accessing the vector, and wherein a size of the useful data is smaller than a size of the vector.

7. The method of claim 6, further including executing the vector store instruction to store only the useful data, designated by the location identifier, in the vector register to memory.

8. The method of claim 6, further including designating dedicated bits in the vector store instruction which provide the location identifier.

9. The method of claim 8, wherein a dimension of the vector is $2^n$, and further including designating n bits in the vector store instruction to provide the location identifier.

10. The method of claim 6, further including using the vector store instruction in a data processor having a paired singles execution unit, wherein two single precision values constitute the vector.

11. A data processor, comprising:
a vector processing unit;
a vector register file; and
a load/store unit and an instruction set,
wherein the instruction set includes at least one vector load instruction having a bit format in which an ending location of useful data within the vector is embedded and thus directly identified,
wherein the useful data corresponds to actual data useful to a program accessing the vector,
wherein a size of the useful data is smaller than a size of the vector, and
wherein the vector load instruction further includes one or more bits which provide a constant to be used by the load/store unit to set locations in a vector register file beyond the useful data to the constant.

12. The data processor of claim 11, wherein at least one dedicated bit is provided in the bit format of the instruction to provide the ending location of the useful data within the vector.

13. The data processor of claim 12, wherein the vector has a dimension of $2^n$ and n dedicated bits are provided in the instruction to provide the ending location of the useful data.

14. The data processor of claim 11, wherein the vector has a dimension of two.

15. The data processor of claim 11, wherein the vector processing unit is a paired singles unit which processes two single-precision floating point values in parallel.

16. A data processor, comprising a vector processing unit, a vector register file, a load/store unit and an instruction set, wherein the instruction set includes at least one vector store instruction having a bit format in which an ending location of useful data within the vector is embedded and thus directly identified, wherein the useful data corresponds to actual data useful to a program accessing the vector, and wherein a size of the useful data is smaller than a size of the vector.

17. The data processor of claim 16, wherein at least one dedicated bit is provided in the bit format of the instruction to provide the ending location of the useful data within the vector.

18. The data processor of claim 17, wherein the vector has a dimension of $2^n$ and n dedicated bits are provided in the instruction to provide the ending location of the useful data.

19. The data processor of claim 16, wherein the vector has a dimension of two.

20. The data processor of claim 16, wherein the vector processing unit is a paired singles unit which processes two single-precision floating point values in parallel.

21. A computer executing a vector load instruction, wherein said vector load instruction comprises:
a bit format which includes bits designating a source address where a vector is located;
at least one bit which directly identifies an ending location of useful data within the vector, wherein the useful data corresponds to actual data useful to a program accessing the vector, and wherein a size of the useful data is smaller than a size of the vector;
a value field which provides a constant for use in loading destination vector register locations beyond the useful data; and
a destination vector register to be loaded, wherein upon execution of said load instruction, said useful data is loaded into said destination register leaving at least one unfilled bit and said at least one unfilled bit of said destination register is loaded with said constant.

22. The computer of claim 21, wherein the dimension of the vector is $2^n$, and n bits are designated in the instruction for indicating the ending location of the useful data within the vector.

23. A computer executing a vector store instruction, wherein said vector store comprises a bit format which includes bits designating a source register containing a vector, at least one position bit which directly identifies an ending location of useful data within the vector, and a destination address for the vector, wherein upon execution of said vector store instruction, said useful data is stored to said destination address, wherein the useful data corresponds to actual data useful to a program accessing the vector, and wherein a size of the useful data is smaller than a size of the vector.

24. The computer of claim 23, wherein the dimension of the vector is $2^n$, and n bits are designated in the instruction for indicating the ending location of the useful data within the vector.

25. A method of processing a vector stored in memory, comprising:
providing a vector in memory; and
embedding a location identifier in bits that comprise a vector load instruction, wherein the location identifier directly identifies an ending location in the vector where useful data ends, wherein the useful data corresponds to actual data useful to a program accessing the vector, and wherein a size of the useful data is smaller than a size of the vector.

* * * * *